United States Patent
Rosen et al.

[11] Patent Number: 5,864,303
[45] Date of Patent: Jan. 26, 1999

[54] CAPACITIVE SENSOR SYSTEM FOR MAGNETIC BEARINGS

[75] Inventors: Harold A. Rosen, Santa Monica; Claude Khalizadeh, Thousand Oaks, both of Calif.

[73] Assignee: Rosen Motors L.P., Woodland Hills, Calif.

[21] Appl. No.: 663,791

[22] Filed: Jun. 14, 1996

[51] Int. Cl.[6] .................................................. G08C 19/10
[52] U.S. Cl. .............................. 340/870.37; 340/870.16; 310/90.5
[58] Field of Search ........................ 340/870.37, 870.16; 310/74, 90.5; 322/4

[56] References Cited

U.S. PATENT DOCUMENTS

| | | | |
|---|---|---|---|
| 3,490,816 | 1/1970 | Lyman | 310/90.5 |
| 3,787,100 | 1/1974 | Habermann et al. | 310/90.5 |
| 3,860,300 | 1/1975 | Lyman | 310/90.5 |
| 3,976,399 | 8/1976 | Sabnis | 310/90.5 |
| 4,037,886 | 7/1977 | Boden et al. | 310/90.5 |
| 4,077,678 | 3/1978 | Studer et al. | 310/90.5 |
| 4,080,553 | 3/1978 | Lyman | 318/138 |
| 4,090,745 | 5/1978 | Dohogne et al. | 310/90.5 |
| 4,511,190 | 4/1985 | Caye et al. | 310/90.5 |
| 4,589,707 | 5/1986 | Caye et al. | 310/90.5 |
| 4,617,488 | 10/1986 | Goldowsky | 219/200 |
| 4,700,094 | 10/1987 | Downer et al. | 310/90.5 |
| 4,723,735 | 2/1988 | Eisenhaure et al. | 322/4 |
| 4,872,357 | 10/1989 | Vaillant De Guelis et al. | 74/5.1 |
| 4,918,345 | 4/1990 | Vaillant De Guelis et al. | 310/90.5 |
| 5,036,236 | 7/1991 | Wilson | 310/90.5 |
| 5,142,175 | 8/1992 | Watanabe | 310/90.5 |
| 5,216,308 | 6/1993 | Meeks | 310/90.5 |
| 5,314,868 | 5/1994 | Takahata et al. | 310/90.5 |
| 5,315,197 | 5/1994 | Meeks et al. | 310/90.5 |
| 5,319,273 | 6/1994 | Hockney et al. | 310/90.5 |
| 5,398,571 | 3/1995 | Lewis | 310/90.5 |

*Primary Examiner*—Michael Horabik
*Assistant Examiner*—Andrew Hill
*Attorney, Agent, or Firm*—Westerlund & Powell, P.C.; Raymond H. J. Powell, Jr.; Robert A. Westerlund

[57] ABSTRACT

A capacitive sensor system for an active magnetic bearing supporting a rotating shaft and flywheel in a flywheel energy storage system integrates sensor elements into the bearing stators, thereby conserving valuable space within a vacuum housing enclosing the flywheel energy storage system. High frequency resonant processing provides intrinsic linearity and noise immunity while permitting fast response times. Simple design of the sensor system permits all sensor electronics to be readily packaged within the vacuum housing.

32 Claims, 10 Drawing Sheets

CAPACITIVE SENSOR SYSTEM FOR MAGNETIC BEARINGS

BACKGROUND OF THE INVENTION

1. Field of the Invention

The present invention relates generally to a magnetic bearing. More specifically, the present invention relates to a capacitive sensor for the magnetic bearing, which capacitive sensor measures the displacement of a rotor axis from its desired position within a non-rotating assembly of the magnetic bearing. The capacitive sensor associated with the magnetic bearing is particularly advantageous when employed in a flywheel energy storage system.

2. Description of the Prior Art

Modern high strength-to-weight ratio fibers make it possible to construct high energy density flywheels, which, when combined with high power motor-generators, are an attractive alternative to electrochemical batteries for use as energy buffers in hybrid electric vehicles. A properly designed flywheel system would provide higher energy density, higher power density, higher efficiency, and longer life than a conventional electrochemical battery.

The vehicle environment, however, presents special challenges to successful implementation of a flywheel to motor vehicle applications. Among these challenges are the need to deal with the gyroscopic torques resulting from the vehicle's angular motions and the need to compensate for translational accelerations of the vehicle.

Flywheel energy storage systems have been proposed for many years; many of the storage systems have even been proposed for use in motor vehicles. U.S. Pat. No. 3,741,034, for example, discloses a flywheel contained in an evacuated sphere which is surrounded by a liquid but does not address itself to the dynamics of the driving environment. U.S. Pat. Nos. 4,266,442, 4,285,251 and 4,860,611, on the other hand, disclose different ways of constructing high speed rotors. However, the above referenced patents do not recognize, let alone describe, design features needed for compatibility with the environment of a motor vehicle.

High speed rotors, such as used in high energy density flywheels, often require a magnetic bearing system in order to avoid the problems associated with the lubrication and cooling of mechanical bearings. Magnetic bearings require a set of sensors to measure, with adequate speed and precision, the displacement of the rotor axis from its neutral position in order for the corrective magnetic forces to be applied in a timely fashion.

U.S. Pat. Nos. 3,490,816 and 3,860,300, both of which were issued to Joseph Lyman, describe the general principles of a magnetic bearing system wherein the static load, i.e., the resting weight of a rotor, is supported by one or more permanent magnets while dynamic force generators, i.e., force coils, provide compensation for acceleration differences between the rotor and a surrounding stator. In U.S. Pat. No. 3,490,816, for example, the axial velocity is derived from a sensing coil disposed above the load bearing permanent magnet while axial displacement over relatively long time periods is sensed using an opaque piston, a light source, optical baffles and optical sensors arranged at the end of the rotor shaft opposite the permanent magnet. The system proposed in U.S. Pat. No. 3,490,816 requires two separate amplifiers, one specifically matched to the associated sensor type.

It will be appreciated that non-contacting sensors are required for high speed energy storage flywheel systems because non-contacting sensors offer long life in a high rotational speed environment. Examples of non-contacting sensors are disclosed in U.S. Pat. Nos. 5,036,236 and 5,314,868. While magnetic sensors such as those disclosed in either U.S. Pat. No. 3,490,816 or U.S. Pat. No. 5,036,236 may be used, magnetic sensors are generally degraded by changes in the material properties of the surfaces being sensed, such as the electrical resistivity and magnetic permeability of the sensed surfaces.

On the other hand, optical sensors such as those disclosed in U.S. Pat. No. 3,490,816 are subject to degradation due to fouling from surface contamination. Moreover, optical sensors normally include delicate, sophisticated circuit components. These supporting components would frequently be located outside of the flywheel enclosure, which would require the routing of signal lines between the optical sensors themselves and the supporting components and between the supporting components and the force generators. It will be appreciated that this would severely complicate the connections between the energy storage flywheel and the rest of the power train components. An alternative approach would be to locate the supporting components within the confines of the flywheel, which would simplify the cable routing concerns but would require additional efforts to adapt the supporting components to the environment of the interior of the flywheel, i.e., a vacuum environment.

The present invention was motivated by a desire to correct the perceived weaknesses and identified problems associated with conventional magnetic bearing sensor systems used with flywheel energy storage systems.

SUMMARY OF THE INVENTION

The principle purpose of the present invention is to provide a high accuracy, high speed, and interference free sensing system for controlling rotor position using a five axis active magnetic bearing system for a flywheel energy storage system.

An object according to the present invention is to produce an electrical sensing element for a radial magnetic bearing which is disposed within the void space of the radial magnetic bearing. According to one aspect of the present invention, the electrical sensing element is a capacitive sensor. According to another aspect of the present invention, exact alignment between the capacitive sensor and a bearing force generator, e.g., the radial magnetic bearing, is readily achieved.

Another object according to the present invention is to produce an electrical sensing element for an axial magnetic bearing having a substantially identical footprint to that of the coil disposed with the axial magnetic bearing.

A further object according to the present invention is to provide a capacitive sensor system including at least one capacitive sensor for determining position of a proximate portion of the rotor shaft and a circuit for generating a signal indicative of the position of the rotor shaft. According to one aspect of the invention, the capacitive sensor system is inherently linear. According to another aspect of the present invention, N capacitive sensors can be used with N/2 of the circuits to sense the position of the rotor shaft within a radial magnetic bearing and to generate signals indicative of that position. According to yet another aspect of the present invention, the use of a single master oscillator for all of the capacitive sensors avoids the production of beat frequencies which could introduce false position signals into the capacitive sensor system. According to one other aspect of the present invention, the error signals developed by the capacitive sensors are used to generate the correcting forces in the magnetic force generators which restore the rotor axis to its desired position.

A still further object according to the present invention is to provide a capacitive sensor system including a capacitive sensor for determining position of a proximate portion of the rotor shaft and a circuit for generating a robust position signal indicative of the rotor shaft position. According to one aspect of the invention, the capacitive sensor system includes an inductor for inductively tuning out stray capacitance in the capacitive sensor system. According to another aspect of the present invention, the circuit is powered by a voltage produced by a high frequency oscillator applied to a fixed capacitance via the inductor; the resultant inductive tuning and high frequency voltage signal advantageously cooperate to produce a position signal having a high signal to noise ratio.

Yet another object according to the present invention is to provide a capacitive sensor system capable of the fast response times, in the microsecond range, essential for high speed magnetic bearing control.

These and other objects, features and advantages according to the present invention are provided by a capacitive position sensor, located within the confines of a magnetic bearing supporting a rotating shaft, including a capacitive member disposed proximate to the rotating shaft, the capacitive member being electrically coupled to the rotating shaft so as to permit sensing of capacitance of the capacitive member with respect to the rotating shaft.

These and other objects, features and advantages according to the present invention are provided by a capacitive position sensor located within a bearing stator of a radial magnetic bearing positioning a rotating shaft, the radial magnetic bearing including an outer ring, N teeth disposed within the outer ring, wherein all of the projecting ends of the teeth define a cylindrical surface of predetermined radius, and N coils, each of the coils surrounding a respective one of the teeth and each of the N coils being located adjacent to the outer ring so as to expose an end portion of the respective N teeth proximate to the associated projecting ends. The capacitive position sensor includes a capacitive member disposed within a void space defined by respective projecting ends of adjacent ones of the N teeth and the cylindrical surface and proximate to the rotating shaft, the capacitive member being electrically coupled to the rotating shaft so as to permit sensing of capacitance of the capacitive member with respect to the rotating shaft.

These and other objects, features and advantages according to the present invention are provided by a capacitive position sensor located within the confines of a bearing stator of an axial magnetic bearing axially positioning a rotating shaft including a first end surface proximate to a first end of the rotating shaft and perpendicular to the rotation axis of the rotating shaft, the axial magnetic bearing including a cylindrical coil having a coil axis located coaxial with the rotation axis of the rotating shaft, wherein the axial magnetic bearing includes a second end surface perpendicular to the coil axis, wherein the first and second end surfaces are disposed adjacent to one another and wherein the first and second end surfaces are substantially parallel. The capacitive position sensor includes a capacitive member disposed within the confines of the axial magnetic bearing and between the cylindrical coil and the first end surface of the rotation shaft, the capacitive member being electrically coupled to the rotating shaft so as to permit sensing of capacitance of the capacitive member with respect to the rotating shaft.

These and other objects, features and advantages according to the present invention are provided by a capacitance sensor system detecting position of a rotating shaft in a flywheel energy storage system positioned by a magnetic bearing and generating a control signal indicative of the position of the rotating shaft. Preferably, the capacitive sensor system includes a capacitive member disposed proximate to the rotating shaft, the capacitive member being electrically coupled to the rotating shaft so as to permit sensing of capacitance of the capacitive member with respect to the rotating shaft and a sensing circuit, electrically coupled to the capacitive member, receiving a high frequency voltage signal and generating the control signal responsive to the capacitance between the capacitive member and the rotating shaft.

These and other objects, features and advantages of the invention are disclosed in or will be apparent from the following description of preferred embodiments.

BRIEF DESCRIPTION OF THE DRAWINGS

The preferred embodiments are described with reference to the drawings, in which like elements are denoted by like numbers, and in which:

Fig. 1A is an interior view of selected components of a flywheel energy storage system while

DETAILED DESCRIPTION OF THE PREFERRED EMBODIMENTS

Figure 1A:
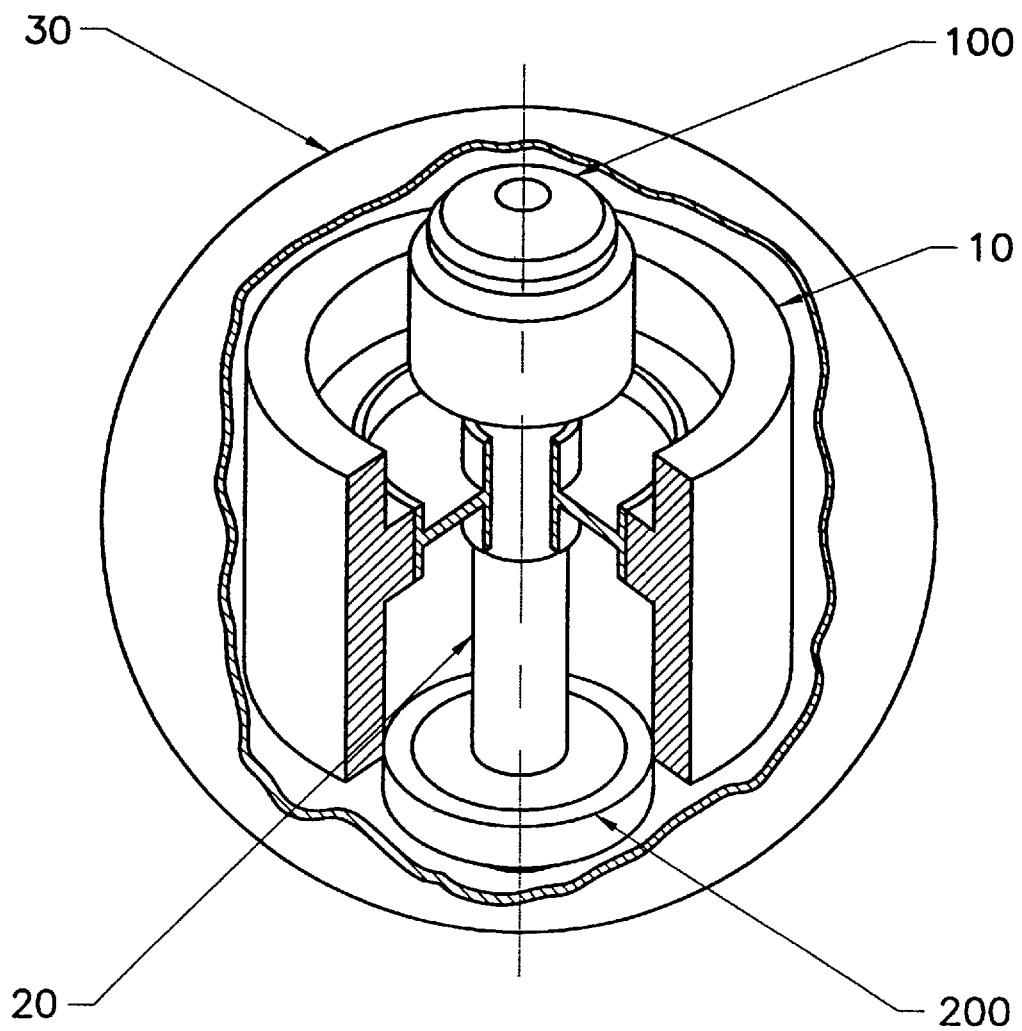
Figure 1B:
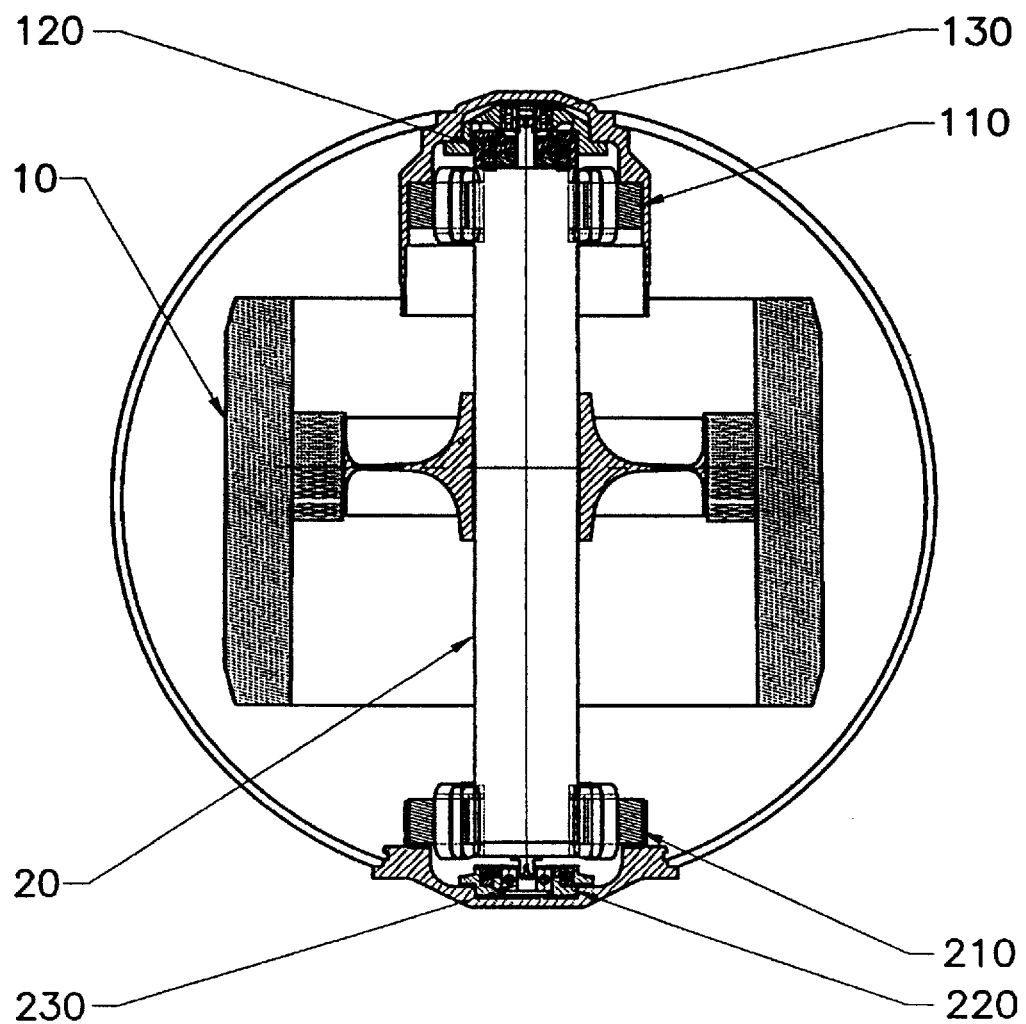
FIG. 1B is a sectional view of these selected components in isolation.

The general arrangement of the flywheel energy storage system according to the present invention is shown in the interior view of FIG. 1A, wherein an energy storing cylinder 10 is connected to the rotating shaft 20, which is supported by upper and lower bearing elements 100 and 200. These components are enclosed within a vacuum housing 30, which housing can be suspended within an outer housing by a gimbal system (not shown), or the like. The bearing elements 100, 200 include respective radial magnetic bearings 110 and 210 and axial bearings 120 and 220, as illustrated in FIG. 1B. Each of the bearing elements advantageously can include a mechanical touchdown bearing 130, 230.

The cylinder 10 in this exemplary case is 12 inches in diameter and stores 4 million joules of energy at a maximum rotational speed of 6500 radians per second. It will be appreciated that this corresponds to a surface speed of 990 meters per second. It will be noted that this high speed requires that the rotating assembly, i.e., the cylinder 10 mechanically connected to rotating shaft 20, be enclosed in an evacuated container, i.e., vacuum housing 30. The combined design requirements of a high rotational speed, a vacuum environment, and a desired long life with low friction makes the use of magnetic bearings preferable to mechanical bearings for this application. The preferred embodiment, according to the present invention illustrated in Figs. 1A and 1B, uses active radial bearings 110,210 in an upper and lower position along the shaft 20, each having two orthogonal force directions transverse to the axis of shaft 20, and active axial bearings 120 and 220 in upper and lower positions along the shaft 20 which have a force direction along the axis of shaft 20.

It should be noted that active radial magnetic bearings require a system of sensors to measure the deviation of the shaft axis from its desired radial position within the respective bearing stator. It should also be noted that active axial magnetic bearings require a sensor to measure the deviation of the shaft from its desired axial position with respect to the respective bearing stator. In a preferred embodiment according to the present invention, each radial bearing 110,210 has a sensor, e.g., sensor element 112 with its nonconducting mechanical supporting structure 114, for each of its force directions, and each axial bearing 120, 220 has a single sensor, for example, sensor 122.

Non-contacting sensors are required for this application because of the requirement for long life in conjunction with the high rotational speeds. Such sensors may be use either magnetic or electric fields for their operation. As discussed above, magnetic sensors are generally degraded by changes in the material properties of the surfaces being sensed, such as their resistivity and permeability and, thus, are not suited for flywheel energy storage system applications. Electric field sensors, which detect the change in capacitance between the sensor element and the rotor shaft, advantageously are not affected by changes in these properties.

The capacitance sensor elements according to the preferred embodiments of the present invention are designed for the bearing elements 100, 200 shown in Fig. 1B and preferably are mechanically integrated into the force generators, providing improvements both in accuracy and ease of assembly compared to systems whose position sensors are physically separate from the force generators. It will be appreciated that the sensors for the radial and the axial bearing elements 110, 210 and 120, 220, respectively, are of different designs.

Figure 2:
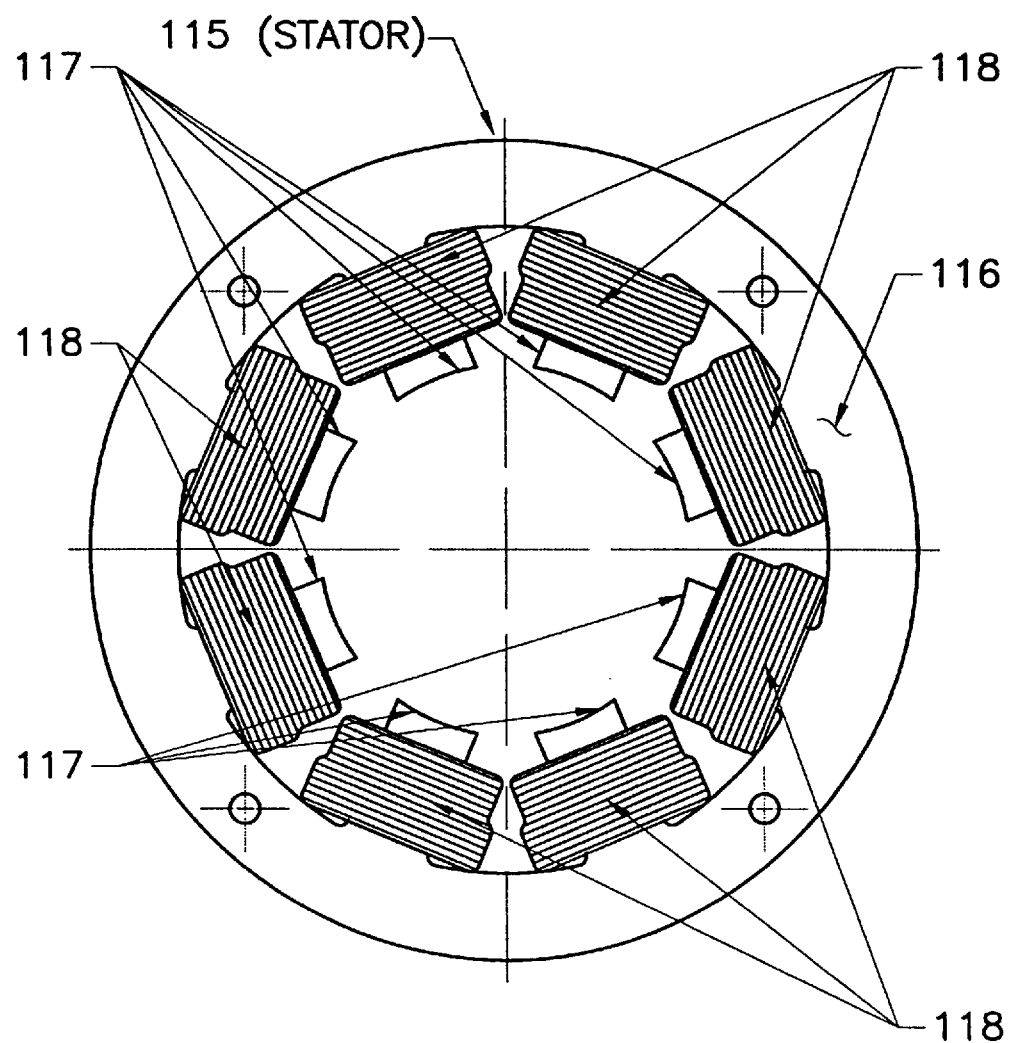
FIG. 2 provides a top view of a radial magnetic bearing associated with the capacitive sensor according to the present invention.
Figure 3:
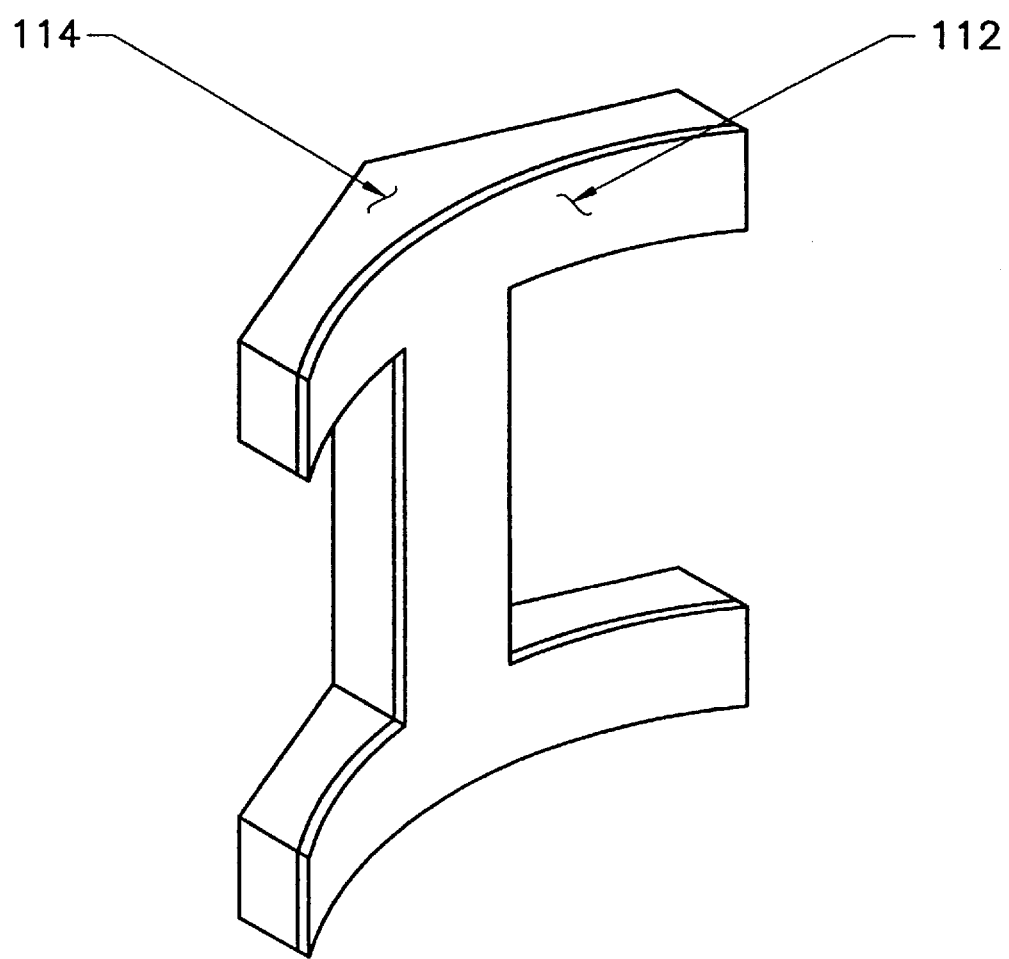
FIG. 3 shows a radial capacitive sensor according to a preferred embodiment of the present invention.
Figure 4:
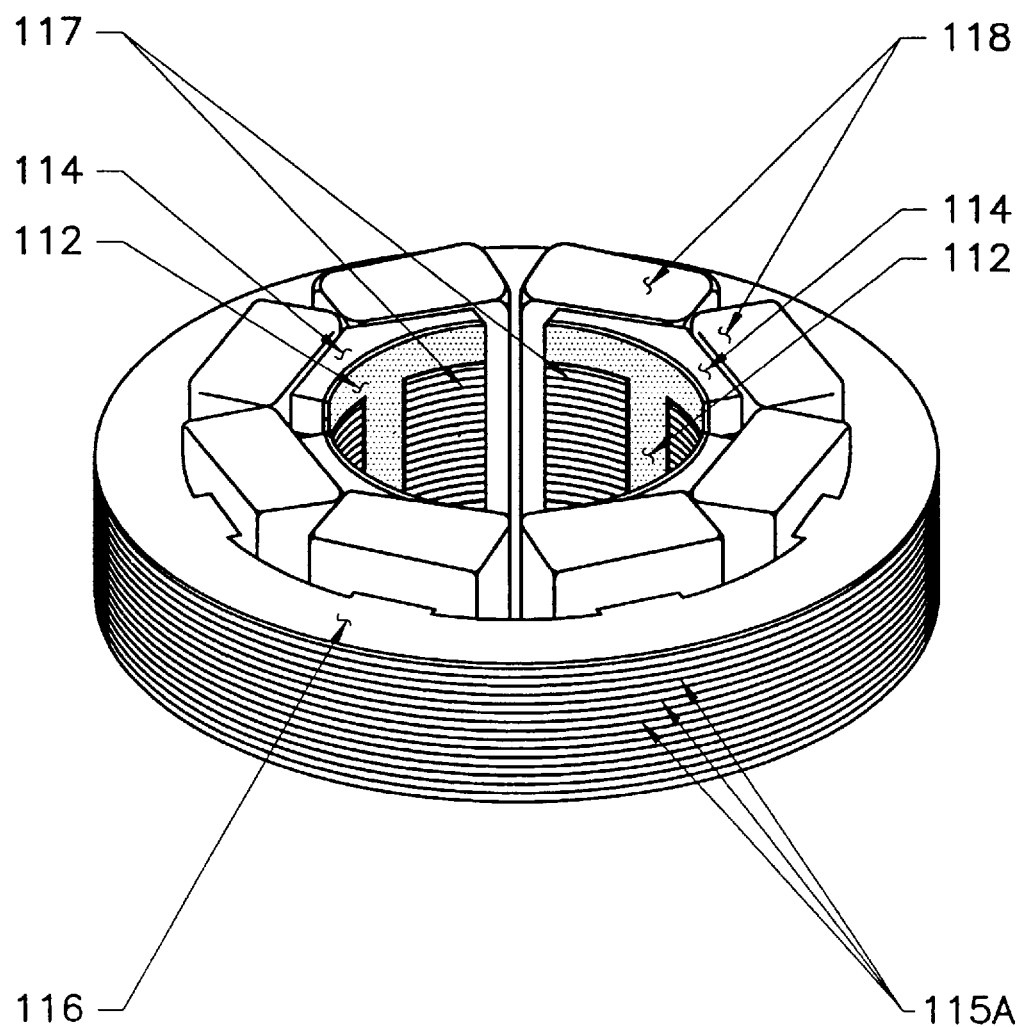
FIG. 4 shows the integration of a radial capacitive sensor illustrated in FIG. 3 into the radial magnetic bearing of FIG. 2.

The stator 115 for a radial bearing 110, illustrated in FIG. 2, is composed of a stack of magnetic steel laminations 115A (illustrated in FIG. 4) and includes an outer ring portion 116 having eight teeth 117, each of which is enclosed by a coil of wire, i. e., winding, 118. It will be appreciated that adjacent pairs of teeth create a magnetic force when current is supplied to the opposing coils, with the direction of this magnetic force being midway between the teeth. FIG. 3 shows a radial sensor element 112 according to a preferred embodiment of the present invention while FIG. 4 shows how radial sensor element 112 fits between two of the teeth 117 for the axial extent of the stator 115, and provides additional sensing area beyond the stator 115, but within the axial space occupied by the windings 118. Thus no additional space in the axial direction is required for the radial sensor 112. Since all of the space along the shaft 20 is occupied by essential elements of the flywheel, providing separate axial locations for the radial sensors would require a longer and heavier shaft, and a larger and heavier enclosure for the flywheel.

Figure 5A:
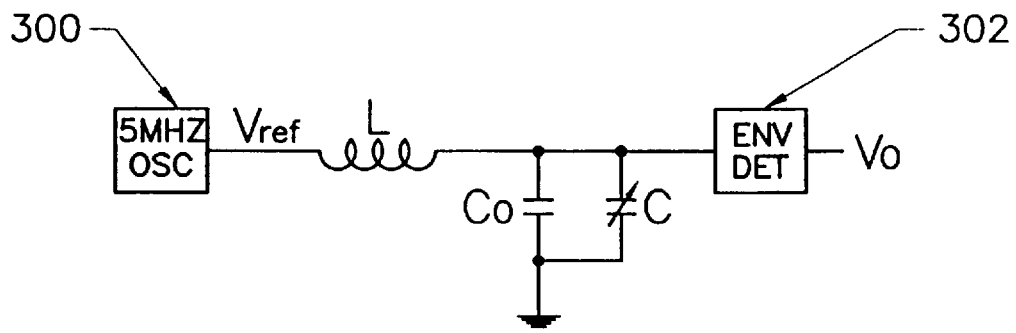
Fig. 5A and 5B are partially schematic, partially block diagrams of alternative capacitive sensor systems incorporating the capacitive sensor embodiments according to the present invention.
Figure 5B:
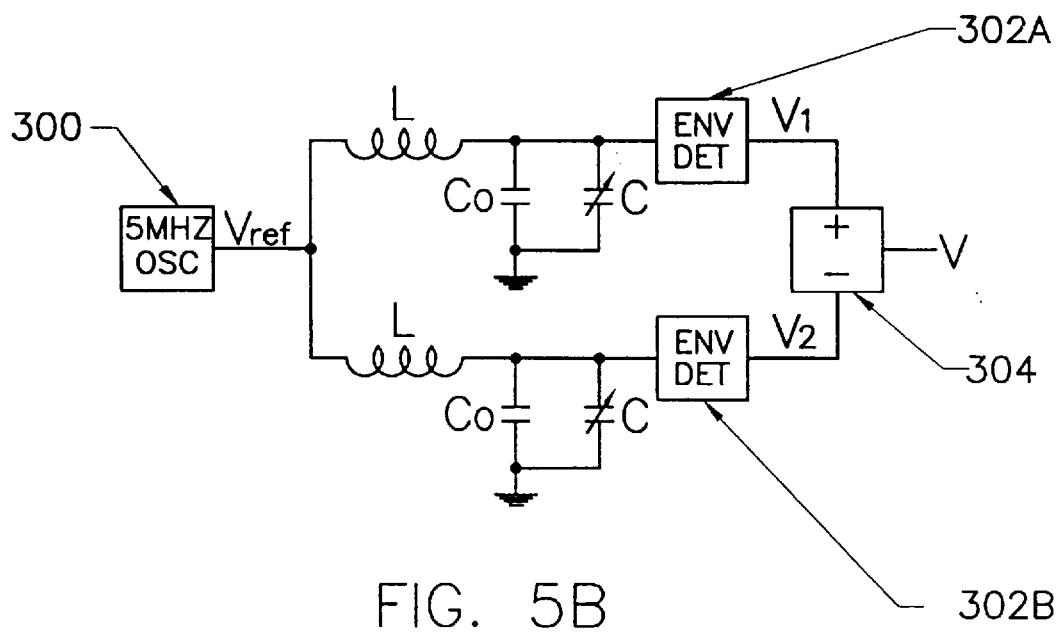
Figure 6:
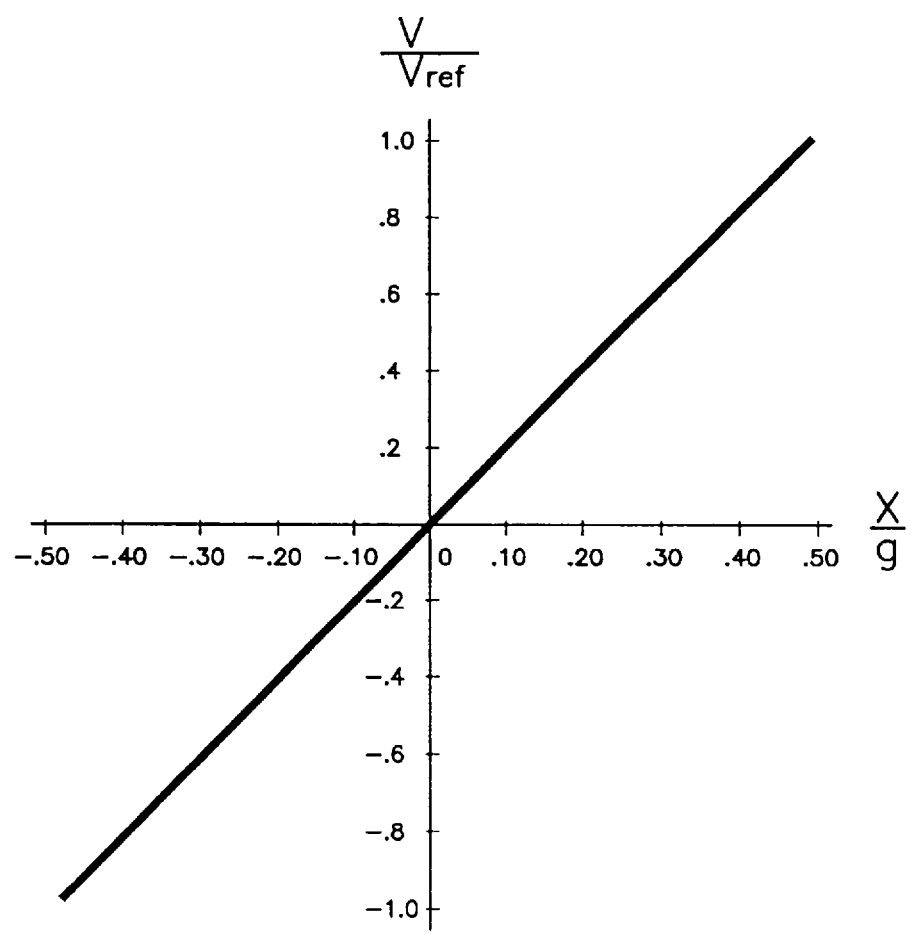
FIG. 6 is a graph which finds use in explaining the radial capacitive sensor response.

Referring now to FIGS. 5A, 5B and 6, the sensing system for each of the two orthogonal axes of the radial magnetic bearing 110 consists of two identical sensor elements 112 on opposite sides of the stator 115 and, thus, separated by shaft 20. Each sensor element 112 has capacitance to the rotating shaft 20 which is inversely proportional to its radial distance from shaft 20. For the undisturbed rotor position, this distance is designated g, and the capacitance is designated C. If the rotating shaft 20 is displaced a distance x from this position, the x axis sensor in the +X direction will have a capacitance with respect to the shaft $C_1(x)$ equal to $Cg/(g-x)$ and the sensor in the −X direction will have a capacitance with respect to the shaft $C_2(x)$ equal to $Cg/(g+x)$. The capacitance of a sensor element 112 to the stator 115 is designated $C_0$. It will be appreciated that the capacitance of the rotating shaft 20 to ground is very large compared to the others, effectively grounding the rotor. Stated another way, the capacitive sensor element 112 acts as one plate in a conventional capacitor, the opposing plate being formed by an adjacent portion of the shaft 20, which shaft is coupled to ground.

A sensor signal processing circuit according to a preferred embodiment of the present invention, for the axial bearing system, is shown in FIG. 5A. The sensor element 122 is connected to a high frequency oscillator 300 which, in an exemplary case is a 5 MHz oscillator, by an inductance L. The transfer function of this circuit is:

$$Vo/Vref = 1/\{1-L[C_0+C(x)]\omega^2\} \quad (1)$$

where Vo is the output voltage of envelope detector 302, Vref is the output reference voltage of oscillator 300, and w is the frequency divided by 2p. When the inductance L is resonated with $C_0$ at the oscillator frequency, the product of L and $C_0$ is $1/\omega^2$. Thus, the transfer function reduces to $$Vo/Vref = -1/LC(x)\omega^2 \quad (2)$$
$$= (x-g)/LCg\omega^2 \quad (3)$$
$$= (x-g)C_0/Cg \quad (4)$$

The output signal Vo is seen to be linearly related to the shaft 20 displacement x. This intrinsic linearity results from the resonance of L with $C_0$. Stated another way, the linearity of sensor output with shaft 20 position is an intrinsic property of the processing electronics, which inductively tunes out any stray capacitance from the capacitance sensor system. It should be noted that the inductive tuning and high frequency voltage signal permit generation of a control signal needed for the respective force generator(s) having a high signal to noise ratio. Moreover, the high frequency voltage signal applied to the capacitive sensor permits a rapid response time for the sensing circuit.

As shown in FIG. 5B, identical circuits are connected to opposing radial sensors 112, and their outputs are detected, yielding signals designated $V_1$ and $V_2$. By subtracting $V_2$ from $V_1$ in subtractor 304, the detected sensor signal becomes $$(V_1-V_2)/Vref=(2x/g)(C_0/C) \quad (5)$$

which is zero when shaft 20 is centered and which is proportional to the displacement of the shaft 20 from its central position, as desired. A normalized plot of this signal is shown in FIG. 6.

Figure 7:
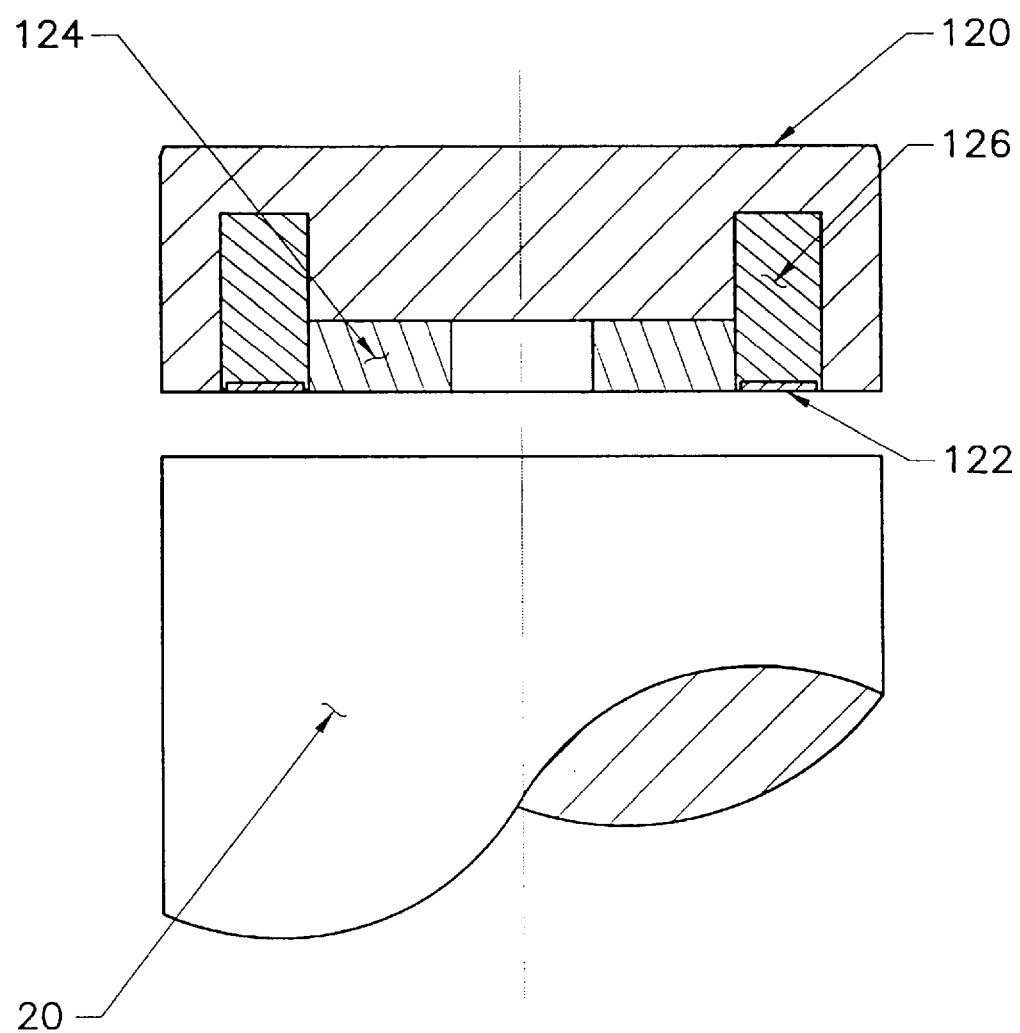
FIG. 7 illustrates the design of an axial magnetic bearing incorporating another preferred embodiment of the capacitive sensor.

Advantageously, the first and second signal paths including first and second inductors, respectively, illustrated in FIG. 5B have equal signal path lengths, thereby enhancing accuracy and linearity of the capacitive sensing system. Moreover, it will be appreciated from FIG. 5B that the exemplary capacitive sensing circuit includes a plurality of branches, each of the branches including a respective inductor, and a high frequency voltage source commonly connected to all branches via a single node. This circuit arrangement beneficially avoids beat frequencies which could introduce false position signals in the capacitive sensing circuit Referring to FIGS. 7, 8 and 9, another preferred embodiment according to the present invention will now be described. An axial bearing 120 which includes the capacitive sensor 122 is shown in FIG. 7. Its magnetic field is produced by a combination of a permanent magnet 124 and a controllable electromagnet 126 whose magnetic field adds algebraically to that of the permanent magnet 124. The power amplifier (not shown), which produces this current, responds to the axial sensor 122 via a suitable transfer function. It is desirable for this sensor output signal to be linear with axial displacement of the shaft 20 over the range of interest, which in an exemplary case ranges from five thousandths to forty thousandths of an inch. The sensor processor shown in FIG. 5A has adequate linearity for this task, a consequence of resonating the capacitance to the stator $C_0$ with the inductance L at the oscillator frequency.

Figure 8:
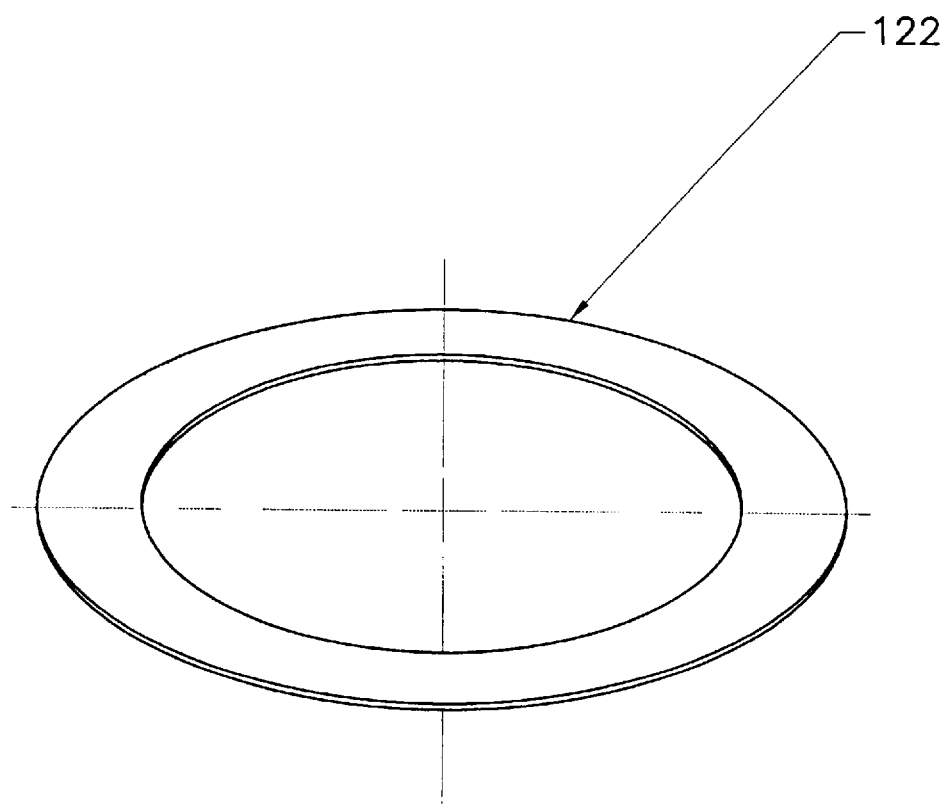
FIG. 8 shows an axial capacitive sensor according to the present invention.
Figure 9:
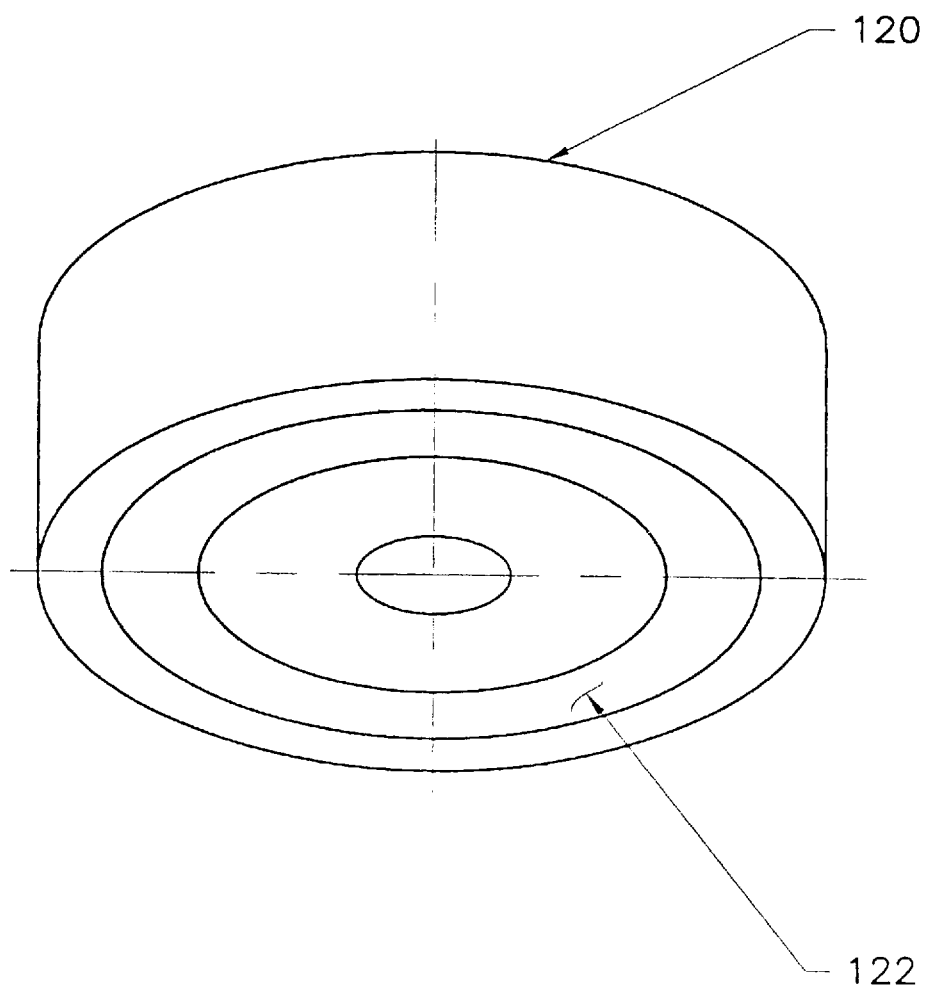
FIG. 9 shows the integration of an axial capacitive sensor into the axial magnetic bearing.

FIG. 8 shows the ring shaped sensing element 122 used in the axial sensing system, and the integration of this element into an axial bearing 120 is shown in FIG. 9.

It should be noted that all of the sensors, both radial and axial, are driven from a single oscillator 300, thus simplifying the system and precluding the generation of disruptive beat frequencies which would result if separate oscillators were used.

It should also be noted that the magnetic bearing system illustrated in Figs. 1A and 1B preferably is controlled using 4 of the circuits illustrated in FIG. 5B, 2 for each of the radial magnetic bearings, and a single circuit illustrated in Fig, 5A, the latter being connected to axial magnetic bearing 120. It should also be noted that the magnetic bearing system illustrated in FIGS. 1A and 1B advantageously can be controlled using 5 of the circuits illustrated in FIG. 5B, 2 for each of the radial magnetic bearings and 1 controlling the upper and lower axial bearings 120, 220 when additional axial direction stiffness is required.

Furthermore, it should be appreciated that the capacitive sensor system discussed above is designed to fit entirely within the flywheel energy storage system, which includes a vacuum housing defining a pressure boundary. Thus, no part of the capacitive sensing system crosses the pressure boundary.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A capacitive position sensor located within the confines of a magnetic bearing supporting a rotating shaft comprising a capacitive member disposed proximate to the rotating shaft, said capacitive member being electrically coupled to the rotating shaft so as to permit sensing of capacitance of said capacitive member with respect to the rotating shaft.

2. The capacitive position sensor as recited in claim 1, wherein the magnetic bearing is a radial magnetic bearing including a plurality of teeth supporting a respective plurality of coils, and wherein said capacitive member is disposed in a void space within the radial magnetic bearing bounded by the teeth and the coils.

3. The capacitive position sensor as recited in claim 2, wherein said capacitive member includes a curved surface having a radius substantially equal to a radius defined by all ends of the teeth proximate to the rotation axis of the rotating shaft.

4. The capacitive position sensor as recited in claim 1, wherein the magnetic bearing is an axial magnetic bearing including at least one coil whose axis is parallel to the rotation axis of the rotating shaft, and wherein said capacitive member is disposed within the confines of the axial magnetic bearing and between the coil of the axial magnetic bearing and the rotating shaft.

5. The capacitive position sensor as recited in claim 4, wherein said capacitive member is a ring member.

6. The capacitive position sensor as recited in claim 5, wherein said ring member includes an exterior surface located substantially parallel with an exterior surface of the axial magnetic bearing located adjacent to the rotating shaft.

7. A capacitive position sensor located within the confines of a bearing stator of a radial magnetic bearing positioning a rotating shaft, the radial magnetic bearing including an outer ring, N teeth disposed with the outer ring, wherein the N teeth each include a first end coupled to the outer ring and a second end proximate to the axial centerline of the radial magnetic bearing, wherein all of the second ends of the N teeth define a cylindrical surface of predetermined radius, and N coils, each of the N coils surrounding a respective one of the N teeth and each of the N coils being located adjacent to the outer ring and spaced apart from the second ends of the respective N teeth so as to expose an end portion of the respective N teeth proximate to the associated second ends, said capacitive position sensor comprising a capacitive member disposed within a void space defined by respective end portions of adjacent ones of the N teeth and the cylindrical surface and proximate to the rotating shaft, said capacitive member being electrically coupled to the rotating shaft so as to permit sensing of capacitance of said capacitive member with respect to the rotating shaft.

8. A capacitive position sensor located within the confines of a bearing stator of an axial magnetic bearing axially positioning a rotating shaft including a first end surface proximate to a first end of the rotating shaft and perpendicular to the rotation axis of the rotating shaft, the axial magnetic bearing including a cylindrical coil having a coil axis located coaxial with the rotation axis of the rotating shaft, wherein the axial magnetic bearing includes a second end surface perpendicular to the coil axis, wherein the first and second end surfaces are disposed adjacent to one another and wherein the first and second end surfaces are substantially parallel, said capacitive position sensor comprising a capacitive member disposed within the confines of the axial magnetic bearing and between the cylindrical coil and the first end surface of the rotation shaft, said capacitive member being electrically coupled to the rotating shaft so as to permit sensing of capacitance of said capacitive member with respect to the rotating shaft.

9. A capacitive sensor system detecting position of a rotating shaft in a flywheel energy storage system positioned by a magnetic bearing and generating a control signal indicative of the position of the rotating shaft, said capacitive sensor system comprising:

a capacitive member disposed proximate to the rotating shaft, said capacitive member being electrically coupled to the rotating shaft so as to permit sensing of capacitance of said capacitive member with respect to the rotating shaft; and a sensing circuit, electrically coupled to said capacitive member, receiving a high frequency voltage signal and generating the control signal responsive to the capacitance between said capacitive member and the rotating shaft.

10. The capacitive sensor system as recited in claim 9, wherein said sensing circuit comprises:

a signal generator producing said high frequency voltage signal;

an envelope detector producing the control signal;

an inductor serially connecting said signal generator to said envelope detector, wherein the connection between said inductor and said envelope detector defines a common node;

a fixed capacitance coupling said common node to ground; and said capacitive member coupling said common node to ground.

11. The capacitive sensing system as recited in claim 10, wherein said inductor and said fixed capacitance inductively tune out any stray capacitances.

12. The capacitive sensing system as recited in claim 11, wherein the inductive tuning and said high frequency voltage signal permit generation of said control signal having a high signal to noise ratio.

13. The capacitive sensing system as recited in claim 10, wherein said high frequency voltage signal permits a rapid response time for said sensing circuit.

14. The capacitive sensing system as recited in claim 10, wherein said magnetic bearing is an axial magnetic bearing.

15. The capacitive sensor system as recited in claim 9, wherein said capacitive member comprises first and second capacitive members, and wherein said sensing circuit comprises:

a signal generator producing said high frequency voltage signal;

a first envelope detector producing a first output signal;

a first inductor serially connecting said signal generator to said first envelope detector, wherein the connection between said first inductor and said first envelope detector defines a first common node;

a first fixed capacitance coupling said first common node to ground;

said first capacitive member coupling said first common node to ground;

a second envelope detector producing a second output signal;

a second inductor serially connecting said signal generator to said second envelope detector, wherein the connection between said inductor and said second envelope detector defines a second common node;

a second fixed capacitance coupling said second common node to ground;

said second capacitive member coupling said second common node to ground; and a subtractor receiving said first and said second output signals and producing the control signal.

16. The capacitive sensing system as recited in claim 15, wherein said first inductor and said first fixed capacitance and said second inductor and said second fixed capacitance, respectively, inductively tune out any stray capacitances.

17. The capacitive sensing system as recited in claim 16, wherein said inductive tuning and said high frequency voltage signal permit generation of respective first and second output signals having high signal to noise ratios.

18. The capacitive sensing system as recited in claim 15, wherein the first and second signal paths including said first and second inductors, respectively, have equal signal path lengths, thereby enhancing accuracy and linearity of the capacitive sensing system.

19. The capacitive sensing system as recited in claim 18, wherein said high frequency voltage signal permits a rapid response time for said sensing circuit.

20. The capacitive sensing system as recited in claim 9, wherein the flywheel energy storage system includes a vacuum housing defining a pressure boundary and wherein no part of said sensing circuit crosses the pressure boundary.

21. The capacitive sensing system as recited in claim 9, wherein said sensing circuit includes:

a plurality of branches, each of said branches including a respective inductor; and a high frequency voltage source operatively connected via a single node to all of said branches so as to avoid beat frequencies which could introduce false position signals in said sensing circuit.

22. The capacitive sensor system as recited in claim 9, wherein said control signal comprises a plurality of control signals, wherein said capacitive member comprises first, second and third capacitive members, and wherein said capacitive sensing circuit comprises:

a signal generator producing said high frequency voltage signal;

a first envelope detector producing a first of said control signals;

a first inductor serially connecting said signal generator to said envelope detector, wherein the connection between said first inductor and said first envelope detector defines a first node;

a first fixed capacitance coupling said first node to ground; and said first capacitive member coupling said first node to ground;

a second envelope detector producing a first output signal;

a second inductor serially connecting said signal generator to said second envelope detector, wherein the connection between said second inductor and said second envelope detector defines a second node;

a second fixed capacitance coupling said second node to ground;

said second capacitive member coupling said second node to ground;

a third envelope detector producing a second output signal;

a third inductor serially connecting said signal generator to said third envelope detector, wherein the connection between said third inductor and said third envelope detector defines a third node;

a third fixed capacitance coupling said third node to ground;

said third capacitive member coupling said third node to ground; and a subtractor receiving said first and said second output signals and producing a second of said control signals.

23. A capacitive sensor system detecting position of a rotating shaft in a flywheel energy storage system positioned by a magnetic bearing and generating a control signal indicative of the position of the rotating shaft, said capacitive sensor system comprising:

a capacitive member disposed proximate to the rotating shaft, said capacitive member being electrically coupled to the rotating shaft so as to permit sensing of capacitance of said capacitive member with respect to the rotating shaft; and a sensing circuit, electrically coupled to said capacitive member, receiving a high frequency voltage signal and generating the control signal responsive to the capacitance between said capacitive member and the rotating shaft, said sensing circuit comprising:

signal generating means for producing said high frequency voltage signal;

envelope detecting means for producing the control signal; and an inductor serially connecting said signal generating means to said envelope detecting means, wherein the connection between said inductor and said envelope detecting means defines a common node, which common node is coupled to ground through both a fixed capacitance and said capacitive member.

24. The capacitive sensing system as recited in claim 23, wherein said inductor and said fixed capacitance inductively tune out any stray capacitances.

25. The capacitive sensing system as recited in claim 24, wherein said inductive tuning and said high frequency voltage signal permit generation of said control signal having a high signal to noise ratio.

26. The capacitive sensing system as recited in claim 23, wherein said high frequency voltage signal permits a rapid response time for said capacitive sensing circuit.

27. The capacitive sensing system as recited in claim 23, wherein said magnetic bearing is an axial magnetic bearing.

28. A capacitive sensor system detecting position of a rotating shaft in a flywheel energy storage system positioned by a magnetic bearing and generating a control signal indicative of the position of the rotating shaft, said capacitive sensor system comprising:

first and second capacitive members disposed proximate to the rotating shaft, said first and second capacitive members being electrically coupled to the rotating shaft so as to permit sensing of capacitance of said capacitive member with respect to the rotating shaft; and a sensing circuit, electrically coupled to said capacitive member, receiving a high frequency voltage signal and generating the control signal responsive to the capacitance between said capacitive member and the rotating shaft, said sensing circuit comprising:

signal generating means for producing said high frequency voltage signal;

first envelope detecting means for producing a first output signal;

a first inductor serially connecting said signal generating means to said first envelope detecting means, wherein the connection between said first inductor and said first envelope detecting means defines a first common node, and wherein said first common node is electrically coupled to ground by both a first fixed capacitance and said first capacitive member;

second envelope detecting means for producing a second output signal;

a second inductor serially connecting said signal generating means to said second envelope detecting means, wherein the connection between said inductor and said second envelope detecting means defines a second common node, and wherein said second common node is electrically coupled to ground by both a second fixed capacitance and said second capacitive member; and subtracting means for receiving said first and said second output signals and producing the control signal.

29. The capacitive sensing system as recited in claim 28, wherein said first inductor and said first fixed capacitance and said second inductor and said second fixed capacitance, respectively, inductively tune out any stray capacitances.

30. The capacitive sensing system as recited in claim 29, wherein inductive tuning of the capacitive sensing system and said high frequency voltage signal generate respective first and second output signals having high signal to noise ratios.

31. The capacitive sensing system as recited in claim 28, wherein first and second signal paths including said first and second inductors, respectively, have equal signal path lengths, thereby enhancing accuracy and linearity of the capacitive sensing system.

32. The capacitive sensing system as recited in claim 28, wherein said high frequency voltage signal produces a rapid response time for said sensing circuit.

* * * * *